United States Patent [19]

Sciocchetti

[11] Patent Number: 5,228,283
[45] Date of Patent: Jul. 20, 1993

[54] METHOD OF REDUCING NOX EMISSIONS IN A GAS TURBINE ENGINE

[75] Inventor: Michael B. Sciocchetti, Schenectady, N.Y.

[73] Assignee: General Electric Company, Schenectady, N.Y.

[21] Appl. No.: 517,349

[22] Filed: May 1, 1990

[51] Int. Cl.⁵ .................................. F02C 3/30
[52] U.S. Cl. ........................ 60/39.05; 60/737; 60/742
[58] Field of Search .................. 60/39.05, 39.55, 742, 60/748, 737; 239/422, 424, 424.5

[56] References Cited

U.S. PATENT DOCUMENTS

| | | |
|---|---|---|
| 1,572,508 | 2/1926 | Schmidt . |
| 1,814,192 | 7/1931 | Slattengren ............... 60/39.55 |
| 2,847,825 | 8/1958 | Spears . |
| 3,021,673 | 2/1962 | Mock . |
| 4,044,549 | 8/1977 | Zwick . |
| 4,110,973 | 9/1978 | Haeflich et al. . |
| 4,160,362 | 7/1979 | Martens et al. . |
| 4,259,837 | 4/1981 | Russell et al. . |
| 4,290,558 | 9/1981 | Coburn et al. . |
| 4,327,547 | 5/1982 | Hughes et al. ............ 60/39.55 |
| 4,337,618 | 7/1982 | Hughes et al. ............ 60/39.55 |
| 4,342,198 | 8/1982 | Willis ........................ 60/737 |
| 4,425,755 | 1/1984 | Hughes ..................... 60/742 |
| 4,519,769 | 5/1985 | Tanaka . |
| 4,600,151 | 7/1986 | Bradley ..................... 239/400 |
| 4,609,150 | 9/1986 | Pane, Jr. et al. . |
| 4,977,740 | 12/1990 | Madden et al. ........... 239/424.5 |

Primary Examiner—Richard A. Bertsch
Assistant Examiner—Timothy S. Thorpe
Attorney, Agent, or Firm—Nixon & Vanderhye

[57] ABSTRACT

A breech loaded fuel nozzle cartridge assembly is provided for use with a fuel nozzle capable of use with gaseous or distillate fuels. The cartridge assembly includes an elongated water delivery pipe having an interior through passageway extending from a rearward open end to a forward open end. A mounting coupling is fixed to the exterior of the pipe adjacent its rearward end for use in mounting the cartridge assembly within the rearward end of a fuel nozzle body. The forward end of the cartridge pipe is provided with an interior water swirler and an exterior distillate fuel swirler, while the forward end of the fuel nozzle body is provided with an air swirler so that at the fuel nozzle tip, an outer conical air spray, an intermediate distillate or gaseous fuel spray and an inner conical water spray combine to provide a homogenous mixture at the point of combustion.

12 Claims, 3 Drawing Sheets

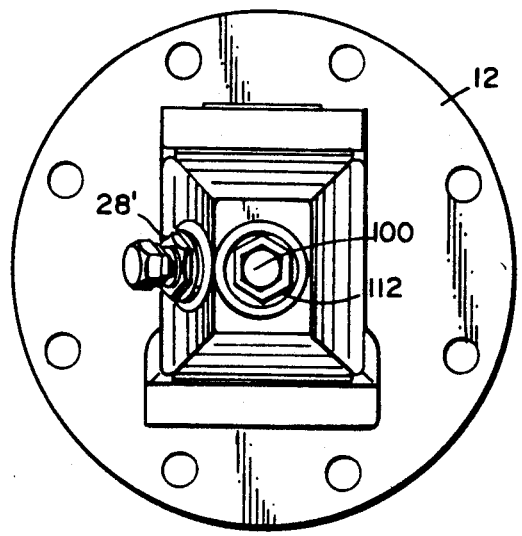
Fig. 3
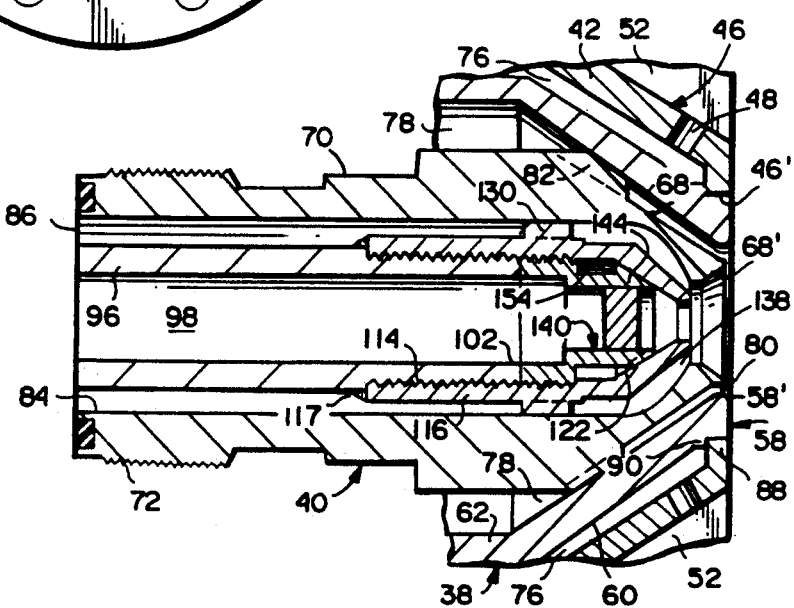
Fig. 4
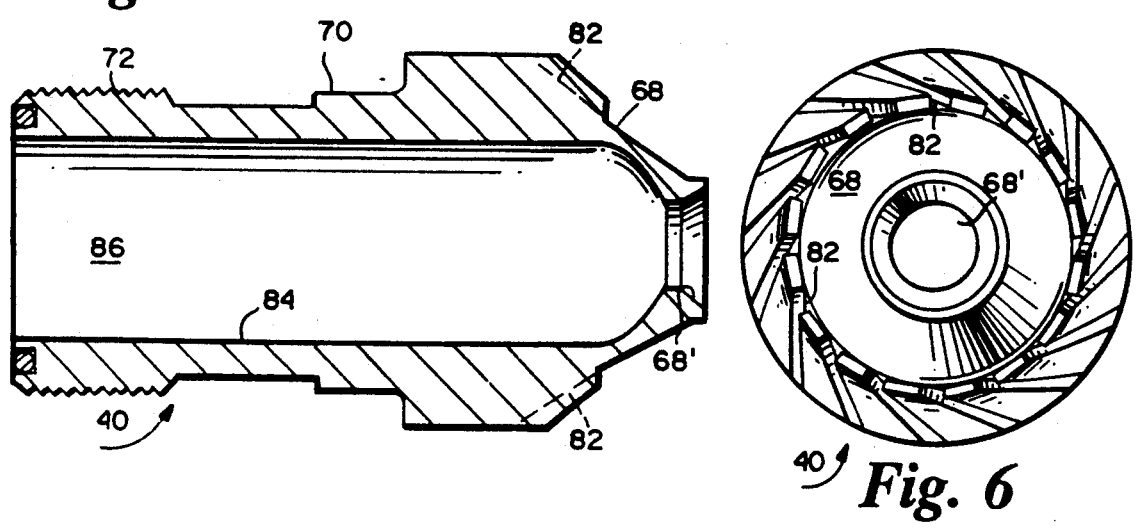
Fig. 5
Fig. 6

METHOD OF REDUCING NOX EMISSIONS IN A GAS TURBINE ENGINE

BACKGROUND AND SUMMARY OF THE INVENTION

The present invention relates to a fuel nozzle construction for use in gas turbine engines and, specifically, to a fuel nozzle utilizing water injection and which can be used with both gaseous and distillate fuels.

It is well known to inject water into the combustion chamber of a gas turbine engine. For example, in U.S. Pat. No. 2,847,825, there is disclosed a water injection system utilized to augment the thrust of an aircraft gas turbine engine for short periods of time, for example during take-off and other emergency conditions.

In U.S. Pat. No. 3,021,673, there is disclosed a water injection system for an automotive gas turbine for improving the acceleration characteristics of the engine.

In U.S. Pat. No. 4,044,549, a process is disclosed for providing low emission combustion gases wherein water is admixed with the fuel for the purpose of forming water vapor containing fuel droplets.

The utilization of water injection systems for substantially reducing NOx emissions is also disclosed in U.S. Pat. Nos. 4,110,973; 4,160,362; 4,259,837; 4,290,558; 4,337,618; 4,342,198; 4,519,769; and 4,600,151.

In the known water injection systems, water is typically injected from a position radially outwardly of the fuel, i.e., the atomized water is fed through the swirl vanes of the gas tip. However, experience has shown that this causes extreme thermogradients in the surrounding cap/cowl and combustion chamber liner assembly as a result of the direct impingement of the water on the hot component parts. The resultant thermal stresses create cracks and greatly reduce the useful life of the components, necessitating increased inspection frequency, maintenance and repair.

Previously, a solution to this problem has been attempted by substituting metal materials which are less prone to cracking, and by insulating the metals with thermal barrier ceramic coatings. While both of the above approaches have had limited success to the extent of extending the useful lives of the components, cracking still occurs.

This invention relates to an improvement over the conventional water injection techniques in that NOx emissions are reduced and the cracking problem associated with water injection is substantially abated. In accordance with this invention, the injected water is introduced directly into the flame center where it is more efficient at NOx control, and also eliminates direct water impingement on hot metals. The fuel nozzle of this invention also provides the capability of burning either gaseous or distillate fuel, utilizing water injection with both.

Preliminary tests of this concept have proven favorable. Specifically, water has been injected through the oil passage on a dual fuel style nozzle while running on gaseous fuel. Results show NOx levels have decreased, liner metal temperature gradients are more favorable, and dynamic pressure activity has remained acceptable.

In accordance with one exemplary embodiment of the invention, a fuel nozzle cartridge assembly including a water delivery pipe is provided for insertion into a central distillate fuel passage of a fuel nozzle body, from the rearward end of the body. This arrangement provides two separate and concentric passageways allowing pressurized water to be fed through the water delivery pipe and injected through the center of the nozzle body into the combustor as a finely atomized conical spray. Distillate fuel is fed through a side mounted inlet and travels through the annulus formed between the internal diameter of the body and the outside diameter of the water delivery pipe. The distillate fuel is injected into the combustor as a conical spray surrounding the water cone with atomization assisted by high pressure air introduced radially outwardly of the distillate fuel spray.

In the event gaseous fuel is to be burned, the distillate fuel passageway is shut down upstream of the nozzle body, and gaseous fuel is introduced into the combustion zone via a separate gaseous fuel passageway in the nozzle body. Water continues to be injected via the water delivery pipe within the distillate fuel passageway, and is again injected into the center of the flame.

In this exemplary embodiment of the invention, the water delivery pipe has an interior through passageway extending from a rearward open end to a forward open end. A mounting coupling is fixed to the exterior of the pipe adjacent its rearward end for use in mounting the cartridge assembly within the rearward end of the fuel nozzle body. A pipe fitting is also secured to the rearward end of the pipe for attachment to a water supply source.

The forward end of the cartridge pipe is provided with an interior water swirler and an exterior distillate fuel swirler, and the forward end of the fuel nozzle body is provided with an air swirler so that at the fuel nozzle tip, an outer conical air spray, an intermediate distillate fuel spray and an inner conical water spray combine to provide a homogenous mixture at the point of combustion.

In a broad aspect of the invention, therefore, a cartridge for supplying water under pressure to a fuel nozzle is provided which comprises an elongated tubular member having a discharge orifice at a forward end thereof, a coupling at a rearward end thereof, and a mounting element for securing the cartridge within a fuel nozzle body adjacent the rearward end.

In another broad but related aspect of the invention, a fuel nozzle for a gas turbine is provided which comprises a fuel nozzle body having gaseous fuel and distillate fuel discharge orifices at a forward end thereof, a tubular water feed cartridge assembly having a water discharge orifice at a forward end thereof; the elongated tubular water feed being concentrically mounted within a distillate fuel passageway of the nozzle body such that the water discharge orifice lies radially within the gaseous fuel and distillate fuel discharge orifices.

In still another related broad aspect of the invention, a method for reducing NOx emissions and for eliminating stress cracking in the combustion components of a gas turbine includes the steps of (a) injecting fuel into the combustion chamber of a gas turbine as a first conical spray; and (b) injecting water into the combustion chamber as a second, finely atomized conical spray located radially inwardly of the first conical spray so as to avoid direct water impingement on hot metal surfaces within said combustion chamber.

Additional objects and advantages of the present invention will become apparent from the detailed description of the invention which follows.

BRIEF DESCRIPTION OF THE DRAWINGS

FIG. 3 is a rear view of the fuel nozzle body and the breech loaded cartridge assembly illustrated in FIG. 1;

FIG. 4 is an enlarged view of the forward end portion of the nozzle body shown in FIG. 1;

FIG. 5 is an enlarged cross sectional view of a air swirler component utilized in the fuel body shown in FIG. 1;

FIG. 6 is a front view of the air swirler shown in FIG. 5;

DETAILED DESCRIPTION OF THE DRAWINGS

Figure 1:
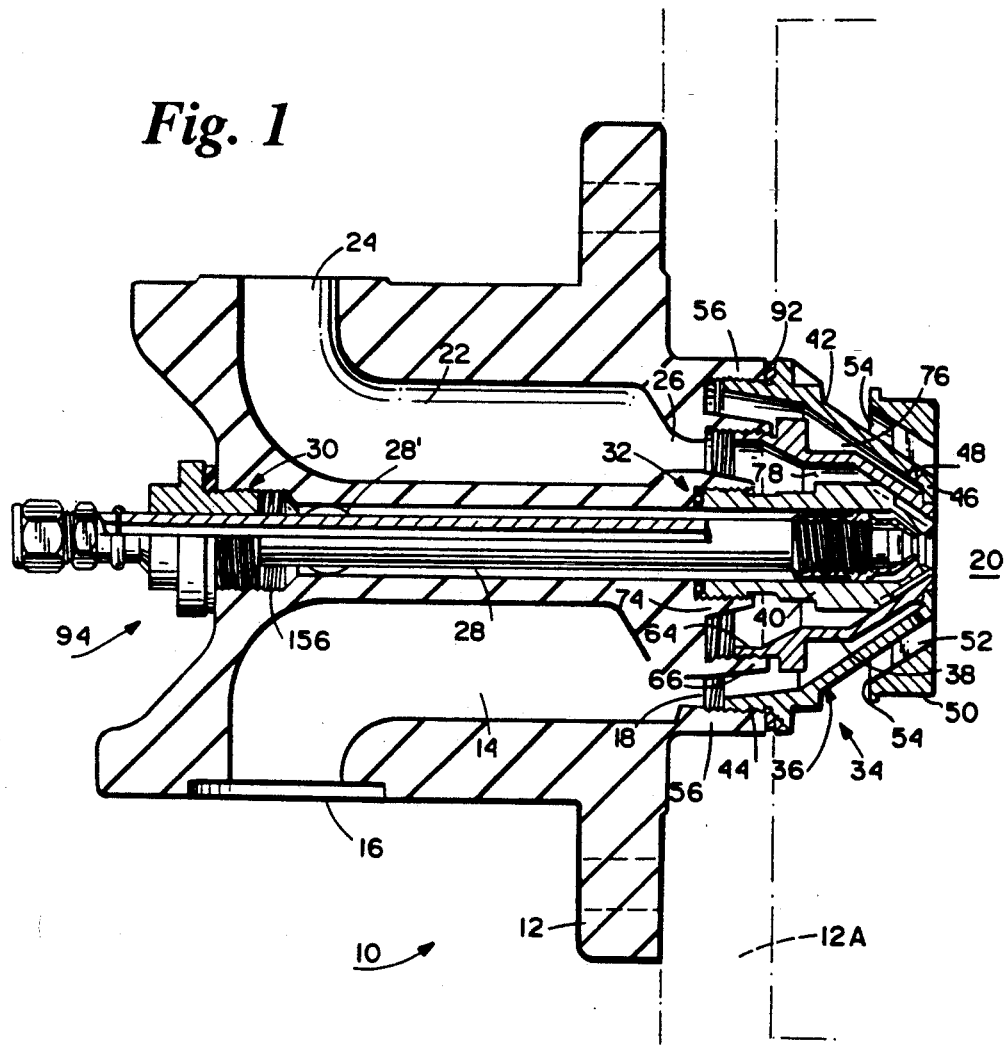
FIG. 1 is a cross sectional view of a fuel nozzle body with a breech loaded cartridge assembly mounted therein in accordance with an exemplary embodiment of the invention.

With reference to FIG. 1, a cast fuel nozzle body 10 in accordance with this invention is provided with an integral mounting flange 12 for attachment to an outer case assembly 12A of a gas turbine combustor (partially shown in phantom). The fuel nozzle body 10 is designed for use in burning either gas or distillate fuel. To this end, the fuel nozzle body 10 is provided with a first interior passageway 14 including an inlet end 16 and an outlet end 18 for supplying gaseous fuel to the combustion zone 20 of the combustor.

A second passageway 22 is provided in the fuel nozzle body 10 including an inlet end 24 and an outlet end 26 for supplying air to the combustion zone 20 of the combustor.

A third passageway 28 is centrally located within the fuel nozzle body 10 and extends from a rearward inlet end 30 to a forward outlet end 32 for supplying distillate fuel, i.e., oil, to the combustion zone 20.

Mounted on the forward end of the fuel nozzle body 10 is a nozzle assembly 34 which includes an outer gas tip 36, an intermediate air cone 38 and an inner air swirler 40. The nozzle assembly 34 is threadably secured to the nozzle body 10 as will be described in more detail below.

With reference now particularly to FIGS. 1 and 4, the gas tip 36 includes a conical portion 42, a rearward mounting portion 44, and a forward end 46 provided with a plurality of angled apertures 48 arranged about a central opening 46' at the forward end 46. An outer ring 50 is fixed to the conical portion 42 by a plurality of angled vanes or ribs 52 to thereby establish passageways 54 for directing and swirling additional air from the compressor into the combustion zone 20 as will be explained in greater detail below.

The rearward mounting portion 44 of the gas tip 36 is formed with exterior threads for engagement with interior threads formed on a radially outermost portion 56 of the nozzle body 10.

The intermediate air tip 38 is provided with a forward end 58 provided with a central aperture 58', a conical portion 60, a cylindrical portion 62 just behind the conical portion 60, and a rearward mounting portion 64. The rearward mounting portion 64 is provided with exterior threads for engagement with interior threads formed on a radially intermediate portion 66 of the nozzle body 10.

The inner air swirler 40, shown in detail in FIGS. 5 and 6, is formed with a forward conical portion 68 provided with a central flared aperture 68' and a generally cylindrical stepped portion 70 extending rearwardly of the conical portion, terminating in a rearward mounting portion 72. The latter is provided with exterior threads for engagement with interior threads formed on a radially innermost portion 74 of the nozzle body 10.

It will be appreciated from the above description, and particularly from FIGS. 1 and 4, that the gas tip 36 and intermediate air tip 38 combine to form a gas passageway 76 communicating directly with the gas passageway 14. When the gas turbine is in a gaseous fuel burning mode, gas flowing through passageway 14 flows into passageway 76 and exits the apertures 48, and is directed by the ring 50 into the combustion zone 20.

At the same time, the intermediate air tip 38 combines with the inner air swirler 40 to form a passageway 78 communicating directly with the air passageway 22 in the nozzle body 10. Air flowing through passageway 22 flows into passageway 78 and exits an orifice 80 created by the opening 58' of the air tip 38 and the forward conical portion 68 of the distillate tip 40.

As best seen in FIG. 6, the air swirler 40 is provided on its exterior peripheral surface with a plurality of angled grooves 82 which cause the air flowing through passageway 78 to swirl prior to exiting the orifice 80.

The air swirler 40 is also provided with an interior bore 84 which extends from an open rearward end 86 to the forward smaller diameter opening 68'. Bore 84 forms an extension of the third passageway 28 for distillate fuel, so that when the gas turbine is in a distillate fuel burning mode, the distillate fuel flowing through passageway 28 from a distillate fuel inlet 28', enters bore 84 at end 86 and exits at the opening 68'.

It will be further appreciated from the above description that in attaching the nozzle assembly 34 to the nozzle body 10, the air swirler 40 is threaded first, followed by the intermediate air tip 38 and then the gas tip 36. Upon attachment of the gas tip 36, a forward, radially inwardly directed lip 88 thereof engages an annular shoulder 90 provided in the air tip 38 to lock the latter in place. At the same time, a lock plate 92 is staked between the gas tip 36 and the radially outermost portion 60 of the nozzle body 10 to lock the gas tip in place.

In further accord with an exemplary embodiment of this invention, a breech load cartridge assembly 94 is inserted within the distillate passageway 28 from the rear of the nozzle body 10.

Figure 2:
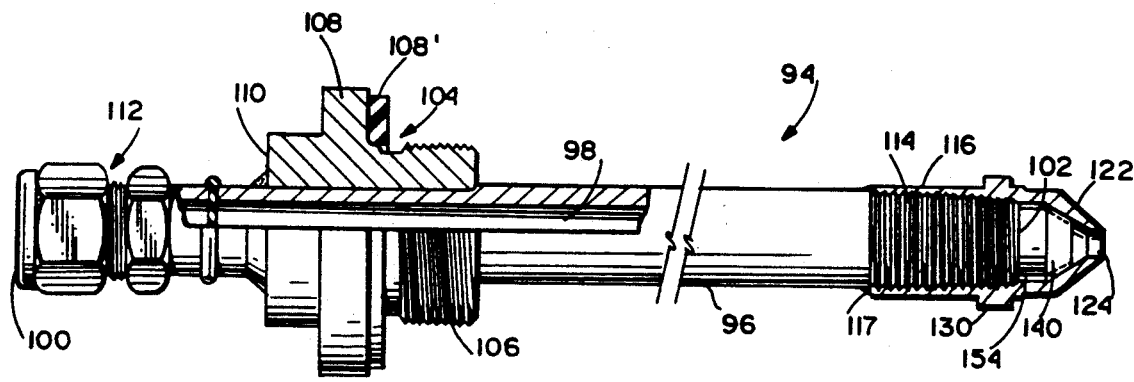
FIG. 2 is a partial cross sectional view of the breech loaded cartridge assembly removed from the fuel nozzle body of FIG. 1.

With reference particularly to FIGS. 1, 2 and 4, the cartridge assembly 94 includes an elongated tubular member or water delivery pipe 96 having an interior through passageway 98 extending from a rearward open end 100 to a forward open end 102. A mounting coupling 104 is fixed to the exterior of the pipe 96 adjacent its rearward end 100 by any suitable means, preferably welding. The coupling 104 is formed with a forward threaded portion 106, an intermediate sealing flange 108 (adapted to cooperate with a sealing gasket 108′) and a rearward end 110. A pipe fitting 112 is secured to the rearward end 100 of the pipe 96 for attachment to a water supply conduit (not shown).

The forward end 102 of pipe 96 is threaded on its exterior surface at 114 to receive a distillate fuel swirler 116, which may be welded in place about its rearward edge as shown at 117. The distillate swirler 116, best seen in FIGS. 2, 4, 7 and 8, is a generally tubular member provided with interior threads extending from an open rearward end 118 along a major portion of the length of the swirler (see FIGS. 2 and 4). The forward end 120 of the swirler is tapered at 122, terminating at a water discharge orifice 124. The distillate swirler 116 is provided on its exterior surface, adjacent the forwardmost portion of the interior threads, with an enlarged annular flange or ring 130 provided with a plurality of angular grooves or slots 132 for swirling the distillate fuel as will be described in more detail below. Just ahead of the ring or flange 130, a generally cylindrical portion 134 of the swirler 116 is formed with a plurality of circumferentially arranged flats 136 which create additional space for the swirling distillate fuel.

The exterior surface of the tapered portion 122 of the distillate swirler 116 combined with an interior tapered surface of the inner distillate tip 40 to form an annular discharge orifice 138 for the distillate fuel.

A water swirler 140 is threadably received within the distillate fuel swirler 116. The water swirler 140, best seen in FIGS. 2, 4 and 9-12 includes a generally cylindrical, solid main body portion 142, a tapered forward surface 144, and a radially enlarged mounting portion 146 provided with exterior threads 148.

Figure 9:
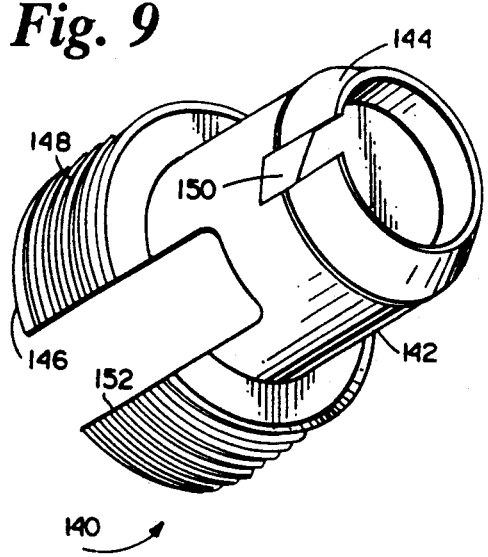
FIG. 9 is an enlarged perspective view of a water swirler utilized in the forward end of the cartridge assembly shown in FIG. 2.
Figure 11:
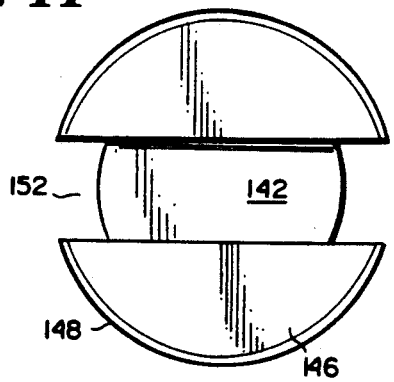
FIG. 11 is a rear view of the water swirler illustrated in FIG. 9.
Figure 10:
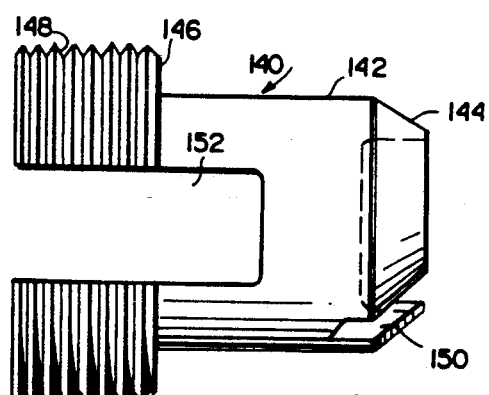
FIG. 10 is a side view of the water swirler shown in FIG. 9.
Figure 12:
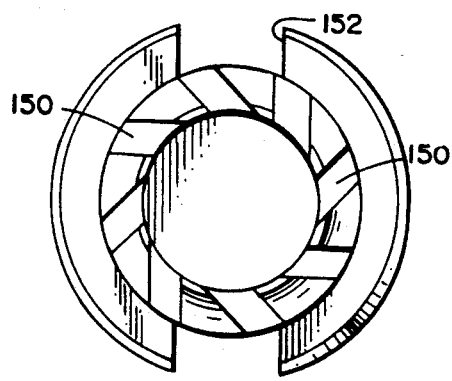
FIG. 12 is a front view of the water swirler illustrated in FIG. 9.
Figure 7:
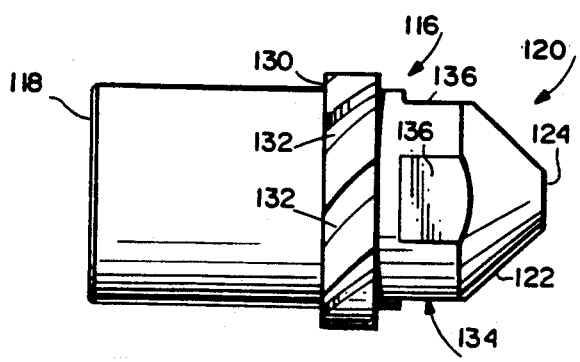
FIG. 7 is an enlarged side view of a distillate fuel swirler mounted on the forward end of the cartridge assembly shown in FIG. 2.
Figure 8:
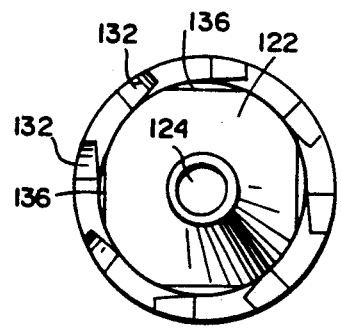
FIG. 8 is a front view of the distillate fuel swirler illustrated in FIG. 7.

The forward tapered surface 144, which extends axially beyond the solid body portion, is formed with a plurality of angularly oriented swirl slots 150 (only one of which is shown in FIGS. 9 and 10 but all of which are shown in FIG. 12) for swirling water flowing through the pipe 94, as described in more detail below. An axially oriented screw driver slot 152 is provided in the water swirler, enabling the swirler to be threadably secured within the forward end of the distillate fuel swirler 116.

In place, and as best seen in FIG. 4, the forward tapered surface 144 of the water swirler engages the interior tapered surface of the tapered portion 122 of the distillate fuel swirler 116, so that the swirl slots 150 combine with the interior surface of tapered portion 122 to form a plurality of circumferentially closed passageways. At the same time, an annular space 154 is created between the tapered surface 144 and the radially enlarged mounting portion 148. As a result, water flowing through pipe 112 must flow through the slot 152, annular space 154 and swirl slots 152 in order to exit the orifice 124.

The water swirler 140 is threadably secured within the distillate fuel swirler 116, and the latter is then threadably secured to the forward end 102 of the pipe 94, so that the forward end 102 of the pipe abuts the rearward end of the water swirler 140.

To assemble the water feed cartridge 94 to the fuel nozzle body 10, the pipe 94 is inserted into the nozzle body from its rearward end, with the forward threaded portion 106 of the mounting coupling 104 engaging the interior threads 156 formed in a counter bore portion of the passageway 28. At the forward end of the cartridge assembly, the enlarged radial ring 130 of the distillate fuel swirler 116 engages the interior surface of the distillate tip 40 to thereby provide support for the cartridge assembly at the forward end of the nozzle body 10.

In use, and as already stated above, the nozzle body 10 and cartridge assembly 94 may be used in either a gaseous fuel burning mode or a distillate fuel burning mode.

When burning gaseous fuel, the distillate fuel supply is shut off upstream of the inlet 28′ and gaseous fuel is introduced into the nozzle body 10 via inlet 16 and passageway 14. The gaseous fuel flows through the conical gas passageway 76 and is swirled as it is discharged through the angled apertures 48 as a conical spray. At the same time, air under pressure is introduced into the nozzle body via inlet 24 and passageway 22. The air then flows through the passageway 78 and is swirled as it flows through the angled grooves 82 prior to discharge through the orifice 80, also in conical form. At the same time, additional air from the compressor flows through the passageway 54 defined by ring 50 and the conical portion 42 of the outer gas tip 38, swirled by vanes or ribs 52.

Simultaneously, water under pressure is introduced into the pipe 96 via inlet 100 and passageway 28. The water flows into the water swirler 140 via slot 152, into the annular space 154, through the angled grooves or slots 150 where it is swirled. The water is discharged through the orifice 124 where it is atomized by the air discharged through the orifice 80, and introduced into the flame center where it mixes with the fuel and air to form a homogeneous fuel/air/water mixture in the combustion zone 20.

In the event distillate fuel is burned in the gas turbine, the gaseous fuel supply is shut off upstream of the inlet 16, and distillate fuel is introduced into the nozzle body 10 via inlet 28′ and passageway 28. The distillate fuel is swirled as it passes through the angled slots 132 prior to discharge through orifice 138 where it mixes with the air and water (as described above) at the combustion zone 20.

It will also be appreciated that the above described breech loaded cartridge assembly for a fuel nozzle body, capable of burning either gaseous or distillate fuel, will decrease NOx emissions by injecting water directly into the flame center. At the same time, this arrangement eliminates direct water impingement on hot metal components of the gas turbine combustor so that the potential for stress cracking of various combustion components is minimized or eliminated.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for reducing NOx emissions and for eliminating stress cracking in combustion components caused by combustion in a gas turbine comprising the steps of:

(a) providing a fuel nozzle body having a nozzle assembly arranged to provide a fuel passageway, a combustion air passageway and a water passageway, the water passageway located substantially centrally along a longitudinal axis of the nozzle, the combustion air passageway lying radially outwardly of the water passageway, and the fuel passageway lying adjacent and radially outwardly of the combustion air passageway;

(b) injecting fuel through said fuel passageway and into a combustion chamber of a gas turbine as a first conical spray;

(c) injecting water through said water passageway in said nozzle assembly coincident with said longitudinal axis into said combustion chamber as a second, finely atomized conical spray located radially inwardly of said first conical spray so as to avoid direct water impingement on hot metal surfaces within said combustion chamber; and (d) injecting combustion air through said air passageway in said nozzle assembly into said combustion chamber as a third conical spray located radially between said first and said second conical sprays, wherein the fuel, water and combustion air are mixed upon discharge from said fuel nozzle body in said combustion chamber.

2. The method according to claim 1 wherein said fuel is gaseous fuel.

3. The method of claim 2 and including providing a distillage fuel passageway in said nozzle assembly radially between said water passageway and said air passageway, and optionally injecting said distillate fuel into said combustion.

4. The method of claim 3 wherein said distillage fuel is swirled prior to discharge into said combustion chamber.

5. The method according to claim 1 wherein step (c) is carried out by loading a water feed cartridge into a rearward end of said fuel nozzle body to establish said center water passageway in said nozzle body.

6. The method according to claim 5 wherein step (b) is further carried out by locating a discharge orifice of said water feed cartridge axially adjacent and concentric with a discharge orifice of said fuel nozzle body.

7. The method of claim 1 wherein said combustion air is swirled prior to discharge into said combustion chamber.

8. The method of claim 1 wherein said gaseous fuel is swirled prior to discharge into said combustion chamber.

9. The method of claim 1 wherein said water is swirled prior to discharge into said combustion chamber.

10. A method for reducing NOx emissions generated by combustion in a gas turbine engine comprising the steps of:

a) introducing three discrete conical sprays of water, gaseous fuel and combustion air from a fuel nozzle into a combustion chamber wherein said water spray is radially innermost of said three discrete conical sprays of water, fuel and combustion air sprays and wherein said gaseous fuel spray is radially outermost of said three discrete sprays of water, fuel and combustion air; and b) mixing said water, fuel and combustion air to provide a homogeneous mixture in a combustion zone of the combustion chamber.

11. The method of claim 10 wherein said water, fuel and air are each swirled prior to introduction into said combustion chamber.

12. The method of claim 10 and including the step of providing a distillate fuel passageway for optionally injecting distillage fuel as a fourth conical spray which is radially between said water spray and said combustion air spray.

* * * * *